United States Patent
Hamada et al.

(10) Patent No.: US 10,549,776 B2
(45) Date of Patent: Feb. 4, 2020

(54) AUTOMATIC STEERING CONTROL APPARATUS AND STEERING CONTROL METHOD

(71) Applicant: Mitsubishi Electric Corporation, Tokyo (JP)

(72) Inventors: Tetsuharu Hamada, Tokyo (JP); Shunsuke Nakajima, Tokyo (JP); Rei Yoshino, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 78 days.

(21) Appl. No.: 15/867,872

(22) Filed: Jan. 11, 2018

(65) Prior Publication Data

US 2018/0339728 A1 Nov. 29, 2018

(30) Foreign Application Priority Data

May 29, 2017 (JP) ................................ 2017-105177

(51) Int. Cl.
  *B62D 6/00* (2006.01)
  *B60W 10/20* (2006.01)
  (Continued)

(52) U.S. Cl.
  CPC .................... *B62D 6/002* (2013.01)

(58) Field of Classification Search
  CPC ........ B62D 6/002; B62D 1/28; B62D 15/025; B60W 10/20; B60W 30/12
  (Continued)

(56) References Cited

U.S. PATENT DOCUMENTS

2018/0238696 A1* 8/2018 Takeda .................. G01C 21/26
2018/0294755 A1* 10/2018 Mori ....................... H02P 21/18
2018/0348761 A1* 12/2018 Zhu ....................... G05D 1/0212

FOREIGN PATENT DOCUMENTS

JP    2000-322697 A    11/2000
JP    2015-077908 A    4/2015
(Continued)

OTHER PUBLICATIONS

Communication dated Sep. 25, 2018 from the Japanese Patent Office in counterpart Application No. 2017-105177.
(Continued)

*Primary Examiner* — Yazan A Soofi
(74) *Attorney, Agent, or Firm* — Sughrue Mion, PLLC; Richard C. Turner

(57) ABSTRACT

A coordinate obtaining unit of an automatic steering control apparatus obtains a subject-vehicle coordinate point indicating a current position of a subject vehicle, and a target coordinate point indicating a target position of the subject vehicle. A subject-vehicle state quantity obtaining unit obtains a subject-vehicle state quantity indicating a traveling state of the subject vehicle. A target trajectory determining unit calculates an interpolation coordinate point for interpolating between the subject-vehicle coordinate point and the target coordinate point or between a target coordinate point previously obtained and a target coordinate point subsequently obtained, and determines a target trajectory of the subject vehicle based on the interpolation coordinate point. A steering controller controls a steering control device of the subject vehicle so that the subject vehicle travels following the target trajectory, based on the subject-vehicle state quantity and the target trajectory.

7 Claims, 6 Drawing Sheets

(51) Int. Cl.
*B60W 30/12* (2006.01)
*B62D 1/28* (2006.01)
*B62D 15/02* (2006.01)

(58) Field of Classification Search
USPC .......................................................... 701/41
See application file for complete search history.

(56) References Cited

FOREIGN PATENT DOCUMENTS

| JP | 2017-65473 A | 4/2017 |
| JP | 2017-76234 A | 4/2017 |

OTHER PUBLICATIONS

Communication dated Apr. 24, 2018 issued by the Japanese Patent Office in counterpart application No. 2017-105177.

* cited by examiner

FIG. 4

| BEFORE COORDINATE INTERPOLATING PROCESS | | |
|---|---|---|
| TARGET COORDINATE POINT | 4.0 | 3.0 |
| COORDINATE POINT 1 | 0.0 | 0.0 |
| COORDINATE POINT 2 | 0.0 | 0.0 |
| COORDINATE POINT 3 | 0.0 | 0.0 |
| COORDINATE POINT 4 | 0.0 | 0.0 |
| COORDINATE POINT 5 | 0.0 | 0.0 |
| COORDINATE POINT 6 | 0.0 | 0.0 |
| COORDINATE POINT 7 | 0.0 | 0.0 |
| COORDINATE POINT 8 | 0.0 | 0.0 |
| COORDINATE POINT 9 | 0.0 | 0.0 |
| COORDINATE POINT 10 | 0.0 | 0.0 |
| | X COORDINATE | Y COORDINATE |

⇒

| AFTER COORDINATE INTERPOLATING PROCESS | | |
|---|---|---|
| TARGET COORDINATE POINT | 4.0 | 3.0 |
| COORDINATE POINT 1 | 3.6 | 2.7 |
| COORDINATE POINT 2 | 3.2 | 2.4 |
| COORDINATE POINT 3 | 2.8 | 2.1 |
| COORDINATE POINT 4 | 2.4 | 1.8 |
| COORDINATE POINT 5 | 2.0 | 1.5 |
| COORDINATE POINT 6 | 1.6 | 1.2 |
| COORDINATE POINT 7 | 1.2 | 0.9 |
| COORDINATE POINT 8 | 0.8 | 0.6 |
| COORDINATE POINT 9 | 0.4 | 0.3 |
| COORDINATE POINT 10 | 0.0 | 0.0 |
| | X COORDINATE | Y COORDINATE |

F I G. 5
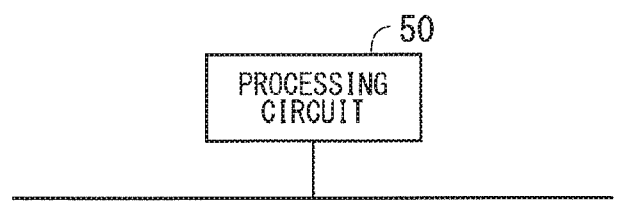
F I G. 6
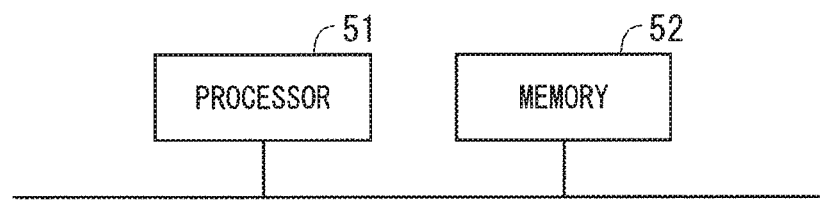

FIG. 7

| | BEFORE COORDINATE INTERPOLATING PROCESS | |
|---|---|---|
| TARGET COORDINATE POINT | 4.0 | 3.0 |
| COORDINATE POINT 1 | 3.6 | 2.7 |
| COORDINATE POINT 2 | 3.2 | 2.4 |
| COORDINATE POINT 3 | 2.8 | 2.1 |
| COORDINATE POINT 4 | 0.0 | 0.0 |
| COORDINATE POINT 5 | 0.0 | 0.0 |
| COORDINATE POINT 6 | 0.0 | 0.0 |
| COORDINATE POINT 7 | 0.0 | 0.0 |
| COORDINATE POINT 8 | 0.8 | 0.6 |
| COORDINATE POINT 9 | 0.4 | 0.3 |
| COORDINATE POINT 10 | 0.0 | 0.0 |
| | X COORDINATE | Y COORDINATE |

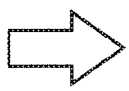

| | AFTER COORDINATE INTERPOLATING PROCESS | |
|---|---|---|
| TARGET COORDINATE POINT | 4.0 | 3.0 |
| COORDINATE POINT 1 | 3.6 | 2.7 |
| COORDINATE POINT 2 | 3.2 | 2.4 |
| COORDINATE POINT 3 | 2.8 | 2.1 |
| COORDINATE POINT 4 | 2.4 | 1.8 |
| COORDINATE POINT 5 | 2.0 | 1.5 |
| COORDINATE POINT 6 | 1.6 | 1.2 |
| COORDINATE POINT 7 | 1.2 | 0.9 |
| COORDINATE POINT 8 | 0.8 | 0.6 |
| COORDINATE POINT 9 | 0.4 | 0.3 |
| COORDINATE POINT 10 | 0.0 | 0.0 |
| | X COORDINATE | Y COORDINATE |

AUTOMATIC STEERING CONTROL APPARATUS AND STEERING CONTROL METHOD

BACKGROUND OF THE INVENTION

Field of the Invention

The present invention relates to an automatic steering control apparatus that controls a steering amount of a vehicle so that the vehicle travels following a target trajectory.

Description of the Background Art

Automatic steering control apparatuses have been proposed which determine a target trajectory with reference to, for example, a traveling trajectory of a preceding vehicle or a centerline of a road and allow a subject vehicle to travel following the determined target trajectory. For example, Japanese Patent Application Laid-Open No. 2015-77908 discloses an automatic steering control apparatus that allows a subject vehicle to travel more accurately following a target trajectory even when a forward direction of the car body of the subject vehicle does not coincide with its traveling direction due to a sideslip of the subject vehicle, etc.

Predetermining a target trajectory allowing the subject vehicle to follow is a precondition for such an automatic steering control apparatus. Until determining a target trajectory, the apparatus will have difficulties in controlling steering without any target trajectory, for example, upon start of the automatic steering control. Thus, disturbances such as the steering by the driver before starting the steering control through a control input may increase a difference between a position of the subject vehicle and a target trajectory which is measured after start of the steering control through the control input, and cause abrupt change in the behavior of the subject vehicle.

SUMMARY

The object of the present invention is to provide an automatic steering control apparatus that can generate a target trajectory when starting steering control.

The automatic steering control apparatus according to the present invention includes a coordinate obtaining unit, a subject-vehicle state quantity obtaining unit, a target trajectory determining unit, and a steering controller. The coordinate obtaining unit obtains a subject-vehicle coordinate point indicating a current position of a subject vehicle, and a target coordinate point indicating a target position of the subject vehicle. The subject-vehicle state quantity obtaining unit obtains a subject-vehicle state quantity indicating a traveling state of the subject vehicle. The target trajectory determining unit calculates an interpolation coordinate point for interpolating between the subject-vehicle coordinate point and the target coordinate point or between a target coordinate point previously obtained and a target coordinate point subsequently obtained, and determines the target trajectory of the subject vehicle based on the interpolation coordinate point. The steering controller controls a steering device of the subject vehicle so that the subject vehicle travels following the target trajectory, based on the subject-vehicle state quantity and the target trajectory.

Since the automatic steering control apparatus according to the present invention can generate a target trajectory when starting steering control, it can immediately start the steering control and reduce abrupt change in the behavior of the subject vehicle.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates a specific example of a coordinate interpolating process;

FIGS. 5 and 6 each illustrate an example hardware configuration of the automatic steering control apparatus; and FIG. 7 illustrates a specific example of a partial coordinate interpolating process.

DESCRIPTION OF THE PREFERRED EMBODIMENTS

Figure 1:
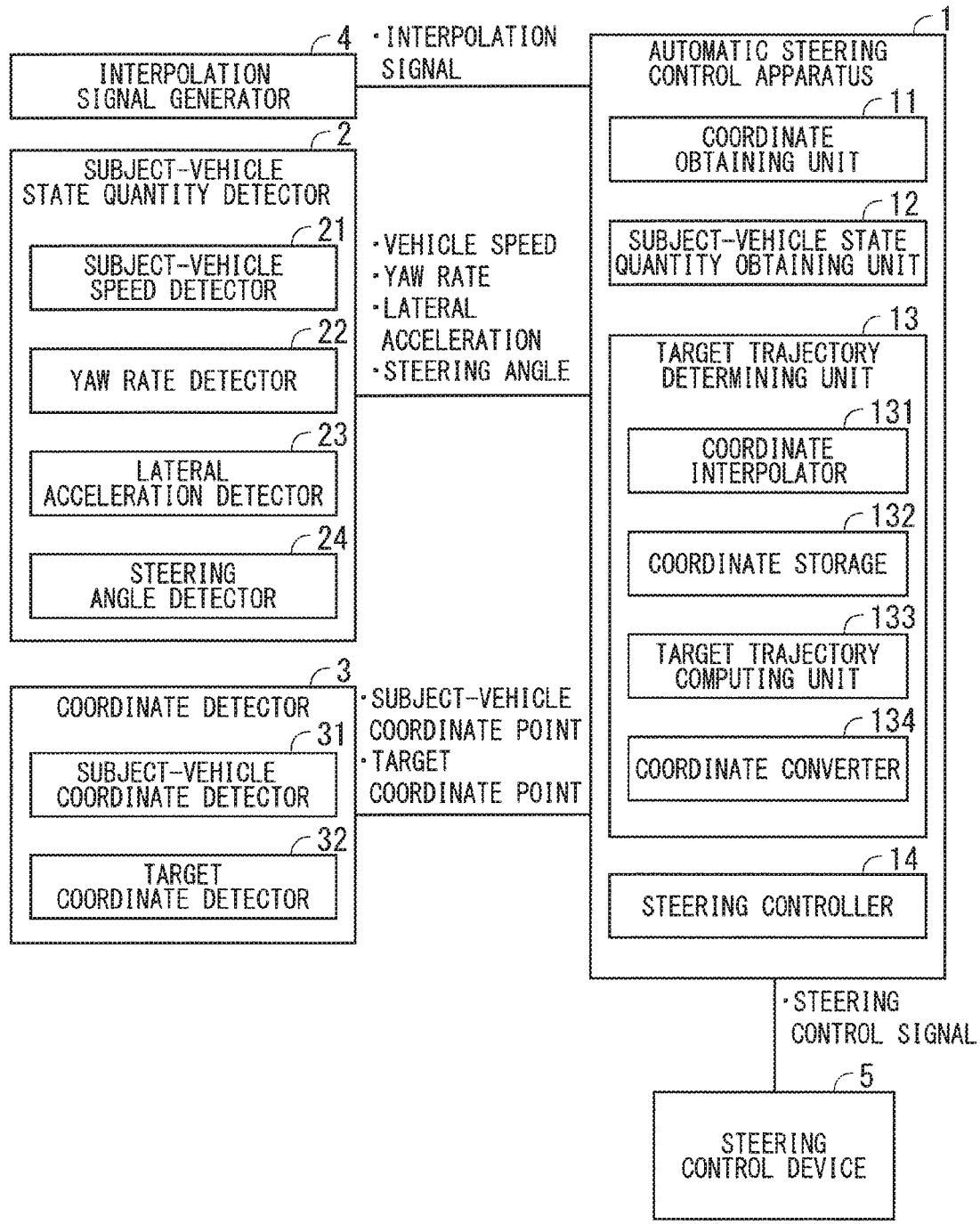
FIG. 1 illustrates a configuration of a vehicle steering system including an automatic steering control apparatus according to Embodiment 1.

An automatic steering control apparatus according to the present invention will be described in the following Embodiments with reference to the drawings. The same reference numerals will be assigned to the same or corresponding constituent elements, and the overlapping description thereof will be omitted in the following Embodiments.

[Embodiment 1]

FIG. 1 illustrates a configuration of a vehicle steering system including an automatic steering control apparatus 1 according to Embodiment 1. This vehicle steering system includes the automatic steering control apparatus 1, and a subject-vehicle state quantity detector 2, a coordinate detector 3, an interpolation signal generator 4, and a steering control device 5 each of which is connected to the automatic steering control apparatus 1. In the following description, a "subject vehicle" will mean a vehicle including this vehicle steering system.

The subject-vehicle state quantity detector 2 obtains various subject-vehicle state quantities each indicating a traveling state of the subject vehicle, and communicates the obtained subject-vehicle state quantities to the automatic steering control apparatus 1. The subject-vehicle state quantity detector 2 includes a subject-vehicle speed detector 21, a yaw rate detector 22, a lateral acceleration detector 23, and a steering angle detector 24 according to Embodiment 1.

The subject-vehicle speed detector 21 detects a traveling speed of the subject vehicle, and outputs, to the automatic steering control apparatus 1, a signal indicating the detected traveling speed. The yaw rate detector 22 detects a yaw rate that is a rate of change of rotation angle in a turning direction of the subject vehicle, and outputs, to the automatic steering control apparatus 1, a signal indicating the detected yaw rate. The lateral acceleration detector 23 detects a lateral acceleration (i.e., lateral gravity) of the subject vehicle, and outputs, to the automatic steering control apparatus 1, a signal indicating the detected lateral acceleration. The steering angle detector 24 detects an angle of a steering wheel (hereinafter referred to as a "steering angle") of the subject vehicle, and outputs, to the automatic steering control apparatus 1, a signal indicating the detected steering angle. The subject-vehicle state quantity detector 2 may further detect, for example, a yaw angle and a steering angle velocity of the subject vehicle. The subject-vehicle state quantity input to the automatic steering control apparatus 1 may include at least one of the traveling speed, the yaw angle, the yaw rate, the steering angle, the steering angle velocity, and the lateral acceleration of the subject vehicle.

The coordinate detector 3 includes a subject-vehicle coordinate detector 31 that detects a subject-vehicle coordinate point indicating a current position of the subject vehicle, and a target coordinate detector 32 that detects a target coordinate point indicating a target position of the subject vehicle. According to Embodiment 1, the subject-vehicle coordinate point and the target coordinate point detected by the coordinate detector 3 are expressed by a fixed coordinate system relative to the current position of the subject vehicle (subject-vehicle fixed coordinate system). Here, the traveling direction of the subject vehicle is defined as an X direction (where its forward direction is positive and its backward direction is negative), and the lateral direction of the subject vehicle is defined as a Y direction (where its right direction is positive and its left direction is negative). The turning direction of the subject vehicle measured as, for example, the yaw rate is defined clockwise as positive and defined counterclockwise as negative.

The subject-vehicle coordinate detector 31 detects the current position of the subject vehicle from a positioning signal received from, for example, a Global Positioning System (GPS) satellite to calculate the subject-vehicle coordinate point indicating the position of the subject vehicle. The subject-vehicle coordinate point is always the origin (0, 0) in the subject-vehicle fixed coordinate system.

The target coordinate detector 32 detects a location as the target position of the subject vehicle from, for example, a front view image captured by a camera positioned at the back of a rearview mirror of the subject vehicle to calculate the target coordinate point indicating the target position of the subject vehicle. Examples of information for detecting the target position include, other than the front view image of the subject vehicle, information on an object in front of the subject vehicle that is detected by a radar of the subject vehicle, surrounding information of the subject vehicle obtained from inter-vehicle communications or road-to-vehicle communications, and map information of the current position of the subject vehicle that is detected by the subject-vehicle coordinate detector 31.

The steering control device 5 is a device that controls a steering angle of the subject vehicle, and includes, for example, an electric motor of an electric power steering (a DC motor or an AC motor with no particular limitation on the type), or a hydraulic pump of a hydraulic power steering system. The steering control device 5 may be any device as long as it can control the steering of the subject vehicle, for example, a steer-by-wire with fewer mechanical linkages between the steering wheel and the wheels.

The automatic steering control apparatus 1 determines a target trajectory of the subject vehicle based on the subject-vehicle coordinate point and the target coordinate point detected by the coordinate detector 3, and controls the steering control device 5 so that the subject vehicle travels following the target trajectory based on the determined target trajectory and the subject-vehicle state quantity detected by the subject-vehicle state quantity detector 2.

The automatic steering control apparatus 1 includes a coordinate obtaining unit 11, a subject-vehicle state quantity obtaining unit 12, a target trajectory determining unit 13, and a steering controller 14.

The coordinate obtaining unit 11 obtains the subject-vehicle coordinate point and the target coordinate point output from the coordinate detector 3. When the subject-vehicle coordinate point and the target coordinate point are expressed by the subject-vehicle fixed coordinate system, the subject-vehicle coordinate point is known to be always (0, 0). Thus, the coordinate obtaining unit 11 may omit obtaining the subject-vehicle coordinate point. The subject-vehicle state quantity obtaining unit 12 obtains a subject-vehicle state quantity (the traveling speed, the yaw rate, the steering angle, and the lateral acceleration of the subject vehicle) output from the subject-vehicle state quantity detector 2. The target trajectory determining unit 13 determines a target trajectory based on the subject-vehicle coordinate point and the target coordinate point obtained by the coordinate obtaining unit 11.

The steering controller 14 controls the steering control device 5 so that the subject vehicle travels following the target trajectory, based on the target trajectory determined by the target trajectory determining unit 13 and the subject-vehicle state quantity detected by the subject-vehicle state quantity detector 2. In other words, the steering controller 14 allows the subject vehicle to follow the target trajectory by calculating a target value of a steering amount (target steering amount) so that the subject vehicle follows the target trajectory, and outputting, to the steering control device 5, a steering control signal (for example, a current to be input to an electronic power steering device) for generating power to reach the target steering amount.

As illustrated in FIG. 1, the target trajectory determining unit 13 includes a coordinate interpolator 131, a coordinate storage 132, a target trajectory computing unit 133, and a coordinate converter 134.

The coordinate interpolator 131 calculates an interpolation coordinate point for interpolating between the subject-vehicle coordinate point and the target coordinate point obtained by the coordinate obtaining unit 11. The coordinate interpolator 131 also calculates, when obtaining the subsequent target coordinate point before the subject vehicle reaches the position indicated by the target coordinate point previously obtained, an interpolation coordinate point for interpolating between the two target coordinate points. The processes for calculating these interpolation coordinate points each will be hereinafter referred to as a "coordinate interpolating process". The interpolation coordinate points to be calculated by the coordinate interpolator 131 will also be expressed by the subject-vehicle fixed coordinate system.

When the coordinate interpolating process is performed between a subject-vehicle coordinate point and a target coordinate point and a plurality of target coordinate points are detected, the coordinate interpolator 131 does not necessarily have to interpolate between the subject-vehicle coordinate point and the closest target coordinate point. For example, the coordinate interpolator 131 may select a target coordinate point for obtaining a target trajectory yielding a steering angle at which the driver does not feel any discomfort (for example, a target trajectory enabling a steering angle necessary for the subject vehicle traveling following the trajectory to fall within a predetermined value), based on at least one of a yaw angle and a yaw rate of the subject vehicle, and interpolate between the subject-vehicle coordinate point and the selected target coordinate point.

The coordinate storage 132 stores the subject-vehicle coordinate point and the target coordinate point obtained by the coordinate obtaining unit 11, and the interpolation coordinate point calculated by the coordinate interpolator 131.

The target trajectory computing unit 133 computes the target trajectory of the subject vehicle based on the subject-vehicle coordinate point, the target coordinate points, and the interpolation coordinate point which are stored in the coordinate storage 132. In other words, the target trajectory computing unit 133 calculates a trajectory reaching the target coordinate point from the subject-vehicle coordinate point through the interpolation coordinate point, or a trajectory reaching the subsequent target coordinate point from the previously obtained target coordinate point through the interpolation coordinate point, and sets the obtained trajectory to the target trajectory.

Since the subject-vehicle coordinate point, the target coordinate points, and the interpolation coordinate point are expressed by the subject-vehicle fixed coordinate system according to Embodiment 1, these coordinate values need to be converted according to the position and change in the direction of the subject vehicle. The coordinate converter 134 performs such a coordinate conversion process. Specifically, the coordinate converter 134 converts coordinate points with a predetermined computation period (for example, a period of 0.01 seconds) according to the following Equation (1), based on a movement amount of the subject vehicle calculated from the traveling speed of the subject vehicle and variations in the yaw angle of the subject vehicle calculated from the yaw rate of the subject vehicle.

$$\begin{bmatrix} X' \\ Y' \end{bmatrix} = \begin{bmatrix} \cos\theta & \sin\theta \\ -\sin\theta & \cos\theta \end{bmatrix} \begin{bmatrix} X \\ Y \end{bmatrix} + \begin{bmatrix} -sx \\ +sy \end{bmatrix} \quad \text{Equation (1)}$$

In Equation (1), sx denotes a movement amount of the subject vehicle in the forward and backward directions (the X direction) per computation period, and sy denotes a movement amount of the subject vehicle in the lateral direction (the Y direction) per computation period. $[X\ Y]^T$ denotes a coordinate point in a current computation period, and $[X'\ Y']^T$ denotes a coordinate point in a computation period next to the current computation period (hereinafter referred to as "next computation period"). θ denotes an integral value of the yaw rate of the subject vehicle in the current computation period, and represents a yaw angle of the subject vehicle. The coordinate converter 134 performs the coordinate conversion process per computation period, which enables the subject-vehicle coordinate point to be always expressed as the origin (0, 0).

Figure 2:
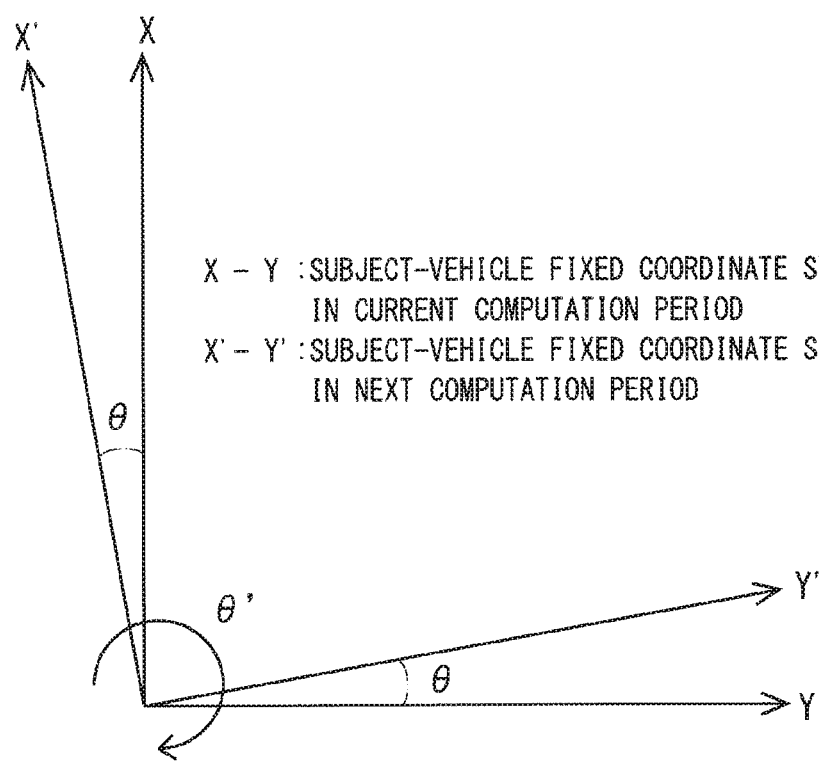
FIG. 2 illustrates a relationship between a coordinate system of a current computation period and a coordinate system of the next computation period.

FIG. 2 illustrates a relationship between a coordinate system in the current computation period and a coordinate system in the next computation period. θ' denotes a yaw rate of the subject vehicle in the current computation period, and θ denotes a yaw angle of the subject vehicle that is obtained by integrating θ'. FIG. 2 disregards variations in the position of the subject vehicle (sx and sy). When the subject vehicle does not move or the movement amount of the subject vehicle is too subtle to be detected by the subject-vehicle state quantity detector 2, both sx and sy are 0.

The interpolation signal generator 4 outputs, to the coordinate interpolator 131 of the target trajectory determining unit 13, an interpolation signal for causing the coordinate interpolator 131 to perform the coordinate interpolating process. When the interpolation signal generator 4 turns ON the interpolation signal, the coordinate interpolator 131 performs the coordinate interpolating process. The interpolation signal generator 4 turns ON the interpolation signal when a particular condition is satisfied. How to output the interpolation signal may be any including turning ON a particular flag in software, a physical push button, a switch, and a relay contact. The interpolation signal is turned ON not necessarily only once for a set of a subject-vehicle coordinate point and a target coordinate point, but as necessary when the coordinate interpolating process is required, for example, when the target coordinate point is reset.

According to Embodiment 1, the interpolation signal generator 4 turns ON the interpolation signal when a new target coordinate point is obtained. However, the interpolation signal generator 4 needs not to turn ON the interpolation signal immediately unless necessary even when a new target coordinate point is obtained. When the subject-vehicle state quantity satisfies a particular condition (for example, a predetermined condition under which the driver does not feel any discomfort), the interpolation signal generator 4 may turn ON the interpolation signal.

Figure 3:
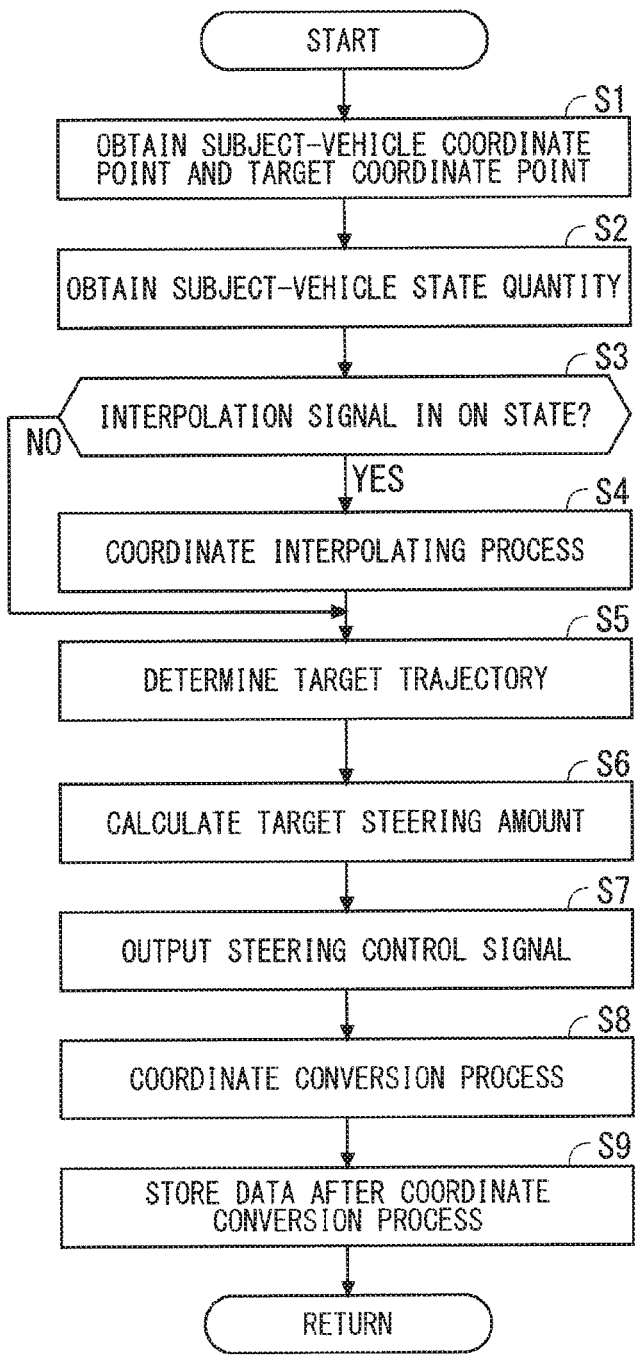
FIG. 3 is a flowchart for describing operations of the automatic steering control apparatus according to Embodiment 1.

FIG. 3 is a flowchart for describing operations of the automatic steering control apparatus 1. The automatic steering control apparatus 1 performs the processes in FIG. 3 per predetermined computation period. The operations of the automatic steering control apparatus 1 per computation period will be described with reference to FIG. 3.

Upon entering each computation period, the coordinate obtaining unit 11 obtains a subject-vehicle coordinate point and a target coordinate point output from the coordinate detector 3 (Step S1). The subject-vehicle state quantity obtaining unit 12 obtains data on a subject-vehicle state quantity (the traveling speed, the yaw rate, the lateral acceleration, and the steering angle of the subject vehicle) output from the subject-vehicle state quantity detector 2 (Step S2). The coordinate storage 132 stores data on the subject-vehicle coordinate point and the target coordinate point obtained by the coordinate obtaining unit 11. When the subject-vehicle fixed coordinate system is used as according to Embodiment 1, the subject-vehicle coordinate point is known to be always (0, 0). Thus, the data on the subject-vehicle coordinate point may not be necessarily obtained from the coordinate detector 3 in Step S1.

Then, the coordinate interpolator 131 of the target trajectory determining unit 13 determines whether to perform the coordinate interpolating process by checking if the interpolation signal output by the interpolation signal generator 4 is in ON state (Step S3).

When the interpolation signal is in ON state (Yes in Step S3), the coordinate interpolator 131 performs the coordinate interpolating process between the subject-vehicle coordinate point and the target coordinate point or between a target coordinate point previously obtained and a target coordinate point subsequently obtained, using the subject-vehicle coordinate point and the target coordinate point obtained in Step S1 (Step S4). The coordinate storage 132 also stores data on the interpolation coordinate point calculated by the coordinate interpolator 131.

The coordinate interpolating process between the subject-vehicle coordinate point and the target coordinate point can be performed using, for example, an interpolating function expressed in Equations (2) below.

$$X_{i|i=1\sim n|} = \frac{n - 1_{|i=1\sim n|}}{n} \times X_a$$

$$Y_{i|i=1\sim n|} = \frac{n - 1_{|i=1\sim n|}}{n} \times Y_a$$

Equations (2)

$X_a$ and $Y_a$ denote an x coordinate and a y coordinate, respectively, of the target coordinate point in Equations (2). Furthermore, n is equivalent to the number of interpolation coordinate points to be provided between the subject-vehicle coordinate point and the target coordinate point.

FIG. 4 illustrates a result of the coordinate interpolating process using Equations (2), where $X_a=4$, $Y_a=3$, and $n=10$. The coordinate data to the left of FIG. 4 is coordinate data of interpolation coordinate points before the coordinate interpolating process (all coordinate points are reset to the subject-vehicle position (0, 0)), whereas the coordinate data to the right of FIG. 4 is coordinate data of the interpolation coordinate points after the coordinate interpolating process. Although the number n of the interpolation coordinate points is 10 here, the number may be any as long as it falls within the limits of the storage capacity of the coordinate storage 132 or processing loads of the automatic steering control apparatus 1.

Although Equations (2) indicate an interpolating function for linearly interpolating between the subject-vehicle coordinate point and the target coordinate point using a first-order equation, an interpolating function for curvilinearly interpolating between them using a high-order equation of order higher than or equal to two may be used. The coordinate interpolating process between the target coordinate point previously obtained and the target coordinate point subsequently obtained can be performed using an interpolating function with a first-order equation similarly as Equations (2) or a high-order interpolating function. The coordinate interpolating process may also be performed by dividing, into sections, a section between the subject-vehicle coordinate point and the target coordinate point or between the target coordinate point previously obtained and the target coordinate point subsequently obtained, and using a different interpolating function in each of the sections.

Upon completion of the coordinate interpolating process, the target trajectory computing unit 133 determines a target trajectory of the subject vehicle based on the subject-vehicle coordinate point, the target coordinate points, and the interpolation coordinate points that are stored in the coordinate storage 132 (Step S5).

When the interpolation signal is in OFF state (No in Step S3), Step S4 is skipped but Step S5 is performed for updating the coordinate information for calculating the target steering amount.

Next, the steering controller 14 calculates the target steering amount based on the target trajectory determined by the target trajectory computing unit 133 (Step S6). Then, the steering controller 14 outputs, to the steering control device 5, the steering control signal for reaching the calculated target steering amount (Step S7).

The coordinate converter 134 performs the coordinate conversion process for converting the subject-vehicle coordinate point, the target coordinate points, and the interpolation coordinate points which are stored in the coordinate storage 132 into a coordinate system for the next computation period using Equation (1) (Step S8). Through this process, the target trajectory determined in Step S5 is also converted into the coordinate system for the next computation period. The coordinate storage 132 stores data of the coordinate points after the coordinate conversion process (Step S9). In the absence of, for example, resetting the target coordinate point or newly obtaining a target coordinate point, the target steering angle in the next computation period is computed (Step S6) based on the target trajectory obtained from the data stored in the coordinate storage 132 in Step S9 for the current computation period. The processes for the first computation period are completed as described above.

Since the automatic steering control apparatus 1 according to Embodiment 1 can generate a target trajectory by interpolating between the subject-vehicle coordinate point and the target coordinate point when starting steering control, the steering control can be immediately started even from a state where the target trajectory is not predetermined. Thus, abrupt change in the behavior of the subject vehicle can be reduced, and the steering control with which the driver does not feel any discomfort can be performed.

FIGS. 5 and 6 each illustrate an example hardware configuration of the automatic steering control apparatus 1. The constituent elements of the automatic steering control apparatus 1 in FIG. 1 (the coordinate obtaining unit 11, the subject-vehicle state quantity obtaining unit 12, the target trajectory determining unit 13, and the steering controller 14) are implemented by, for example, a processing circuit 50 in FIG. 5. In other words, the processing circuit 50 includes: the coordinate obtaining unit 11 that obtains a subject-vehicle coordinate point and a target coordinate point; the subject-vehicle state quantity obtaining unit 12 that obtains a subject-vehicle state quantity; the target trajectory determining unit 13 that calculates an interpolation coordinate point for interpolating between the subject-vehicle coordinate point and the target coordinate point or between a target coordinate point previously obtained and a target coordinate point subsequently obtained, and determines a target trajectory of a subject vehicle based on the interpolation coordinate point; and the steering controller 14 that controls a steering device of the subject vehicle so that the subject vehicle travels following the target trajectory, based on the subject-vehicle state quantity and the target trajectory. This processing circuit 50 may be dedicated hardware, or a processor that executes a program stored in a memory. The processor may also be referred to as a central processing unit (CPU), a processing unit, an arithmetic unit, a microprocessor, a microcomputer, or a digital signal processor (DSP).

When the processing circuit 50 is dedicated hardware, examples of the processing circuit 50 include a single circuit, a composite circuit, a programmed processor, a parallel-programmed processor, an application-specific integrated circuit (ASIC), a field-programmable gate array (FPGA), and any combination of these. A plurality of processing circuits may implement functions of the respective constituent elements of the automatic steering control apparatus 1, or one processing circuit may implement the functions collectively.

FIG. 6 illustrates a hardware configuration of the automatic steering control apparatus 1 when a processor 51 is configured as the processing circuit 50. The functions of the constituent elements of the automatic steering control apparatus 1 are implemented by software, firmware, or a combination of the software and the firmware. For example, the software is described as a program, and stored in a memory 52. The processor 51 functioning as the processing circuit 50 implements the functions of the constituent elements of the automatic steering control apparatus 1 by reading and executing the program stored in the memory 52. In other words, the automatic steering control apparatus 1 includes the memory 52 for storing the program which, when executed by the processing circuit 50, consequently performs the following processes: obtaining a subject-vehicle coordinate point and a target coordinate point; obtaining a subject-vehicle state quantity; calculating an interpolation coordinate point for interpolating between the subject-vehicle coordinate point and the target coordinate point or between a target coordinate point previously obtained and a target coordinate point subsequently obtained; determining a target trajectory of a subject vehicle based on the interpolation coordinate point; and controlling a steering device of the subject vehicle so that the subject vehicle travels following the target trajectory, based on the subject-vehicle state quantity and the target trajectory. Put it differently, this program causes a computer to execute procedures or methods of operations of the constituent elements of the automatic steering control apparatus 1.

Here, examples of the memory 52 include: non-volatile or volatile semiconductor memories such as a random access memory (RAM), a read only memory (ROM), a flash memory, an erasable programmable read only memory (EPROM), and an electrically erasable programmable read only memory (EEPROM); a hard disk drive (HDD), a magnetic disc, a flexible disk, an optical disk, a compact disk, a mini disk, and a digital versatile disc (DVD) and their drive devices; and any storage media to be used in future.

The configuration for implementing the functions of the constituent elements of the automatic steering control apparatus 1 by, for example, one of software and hardware is described above. However, the configuration is not limited to such but part of the constituent elements of the automatic steering control apparatus 1 may be implemented by dedicated hardware or another part thereof may be implemented by, for example, software. For example, the processing circuit 50 can implement the functions of the part of the constituent elements as dedicated hardware. The processing circuit 50 functioning as the processor 51 can also implement the functions of another part of the constituent elements by reading and executing the program stored in the memory 52.

As described above, the automatic steering control apparatus 1 can implement the functions using hardware, software, or a combination of these.

[Embodiment 2]

As described in Embodiment 1, although the coordinate interpolator 131 of the automatic steering control apparatus 1 basically performs the coordinate interpolating process between the subject-vehicle coordinate point and the target coordinate point or between two target coordinate points (the target coordinate point previously obtained and the target coordinate point subsequently obtained), it may perform a partial coordinate interpolating process when a malfunction occurs in a part of data on the interpolation coordinate point, for example, when a part of data on the interpolation coordinate point stored in the coordinate storage 132 is missing or when fluctuations in the data on the interpolation coordinate point substantially increase as a result of the curvilinear coordinate interpolating process using a high-order equation.

When the coordinate interpolating process is performed on part of the section between the subject-vehicle coordinate point and the target coordinate point or between two target coordinate points using a first-order equation, an interpolating function expressed in Equations (3) below can be used.

$$X_{i|i=1\sim n|} = \frac{n-1_{|i=1\sim n|}}{n} \times (X_b - X_c) + X_c$$

$$Y_{i|i=1\sim n|} = \frac{n-1_{|i=1\sim n|}}{n} \times (Y_b - Y_c) + Y_c$$

Equations (3)

As illustrated to the left of FIG. 7, for example, when interpolation coordinate points 4 to 7 which are part of the interpolation coordinate points for interpolating between the subject-vehicle coordinate point and the target coordinate point are missing, the coordinate interpolating process using Equations (3) where $X_b=2.8$, $X_c=0.8$, $Y_b=2.1$, $Y_c=0.6$, and n=5 can correct coordinate data on the interpolation coordinate points 4 to 7 as illustrated to the right of FIG. 7. As such, even when a partial malfunction occurs in data on the interpolation coordinate points, the coordinate interpolator 131 capable of performing such a partial coordinate interpolating process can correct the corresponding data on the interpolation coordinate points and continue the steering control.

Embodiment according to the present invention can be freely combined or appropriately modified and omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. An automatic steering control apparatus, comprising:
a processor to execute a program; and
a memory to store the program which, when executed by the processor, performs processes of:
obtaining a subject-vehicle coordinate point indicating a current position of a subject vehicle, and a target coordinate point indicating a target position of the subject vehicle;
obtaining a subject-vehicle state quantity indicating a traveling state of the subject vehicle;
calculating an interpolation coordinate point for interpolating between the subject-vehicle coordinate point and the target coordinate point or between a target coordinate point previously obtained and a target coordinate point subsequently obtained, and determining a target trajectory of the subject vehicle based on the interpolation coordinate point; and
controlling a steering device of the subject vehicle so that the subject vehicle travels following the target trajectory, based on the subject-vehicle state quantity and the target trajectory, wherein
when a plurality of target coordinate points are detected, the processor selects, from among the plurality of target coordinate points, a target coordinate point for obtaining a target trajectory that enables a steering angle of the subject vehicle traveling following the target trajectory to fall within a predetermined value as a target coordinate point to be paired with the subject-vehicle coordinate point for interpolating, based on at least one of a yaw angle and a yaw rate of the subject vehicle.

2. The automatic steering control apparatus according to claim 1,
wherein the processor calculates the interpolation coordinate point when the subject-vehicle state quantity satisfies a predetermined condition.

3. The automatic steering control apparatus according to claim 1,
wherein the subject-vehicle state quantity includes at least one of a traveling speed, a yaw angle, a yaw rate, a steering angle, a steering angle velocity, and a lateral acceleration of the subject vehicle.

4. The automatic steering control apparatus according to claim 1,
wherein the processor calculates the interpolation coordinate point for linearly or curvilinearly interpolating between the subject-vehicle coordinate point and the target coordinate point or between the target coordinate point previously obtained and the target coordinate point subsequently obtained.

5. The automatic steering control apparatus according to claim 4, wherein the processor linearly interpolates between the subject-vehicle coordinate point and the target coordinate point or between the target coordinate point previously obtained and the target coordinate point subsequently obtained, using a first-order equation.

6. The automatic steering control apparatus according to claim 4,
wherein the processor curvilinearly interpolates between the subject-vehicle coordinate point and the target coordinate point or between the target coordinate point previously obtained and the target coordinate point subsequently obtained, using a high-order equation of order higher than or equal to two.

7. A method for controlling steering of a subject vehicle, the method comprising:
obtaining a subject-vehicle coordinate point indicating a current position of the subject vehicle, and a target coordinate point indicating a target position of the subject vehicle;
obtaining a subject-vehicle state quantity indicating a traveling state of the subject vehicle;
calculating an interpolation coordinate point for interpolating between the subject-vehicle coordinate point and the target coordinate point or between a target coordinate point previously obtained and a target coordinate point subsequently obtained, and determining a target trajectory of the subject vehicle based on the interpolation coordinate point; and
controlling a steering device of the subject vehicle so that the subject vehicle travels following the target trajectory, based on the subject-vehicle state quantity and the target trajectory, wherein
when a plurality of target coordinate points are detected, based on at least one of a yaw angle and a yaw rate of the subject vehicle, a target coordinate point for obtaining a target trajectory that enables a steering angle of the subject vehicle traveling following the target trajectory to fall within a predetermined value is selected, from among the plurality of target coordinate points, as a target coordinate point to be paired with the subject-vehicle coordinate point for interpolating.

* * * * *